Z. B. Sims.
Cultivator.
No. 94,351. Patented Aug. 31, 1869.
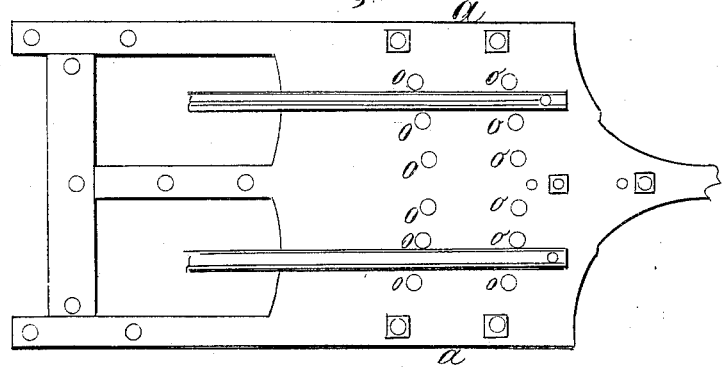
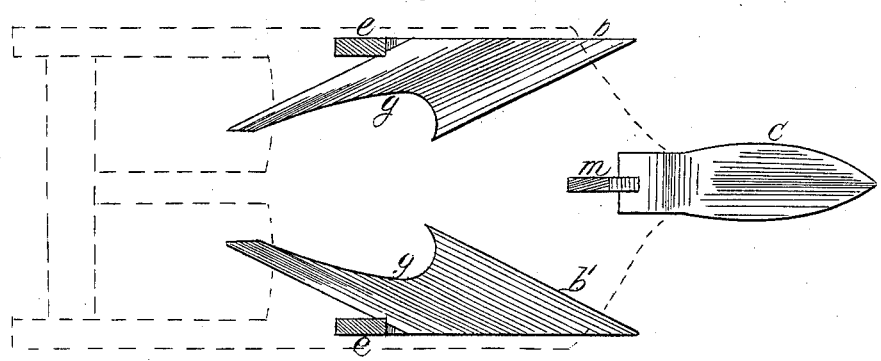
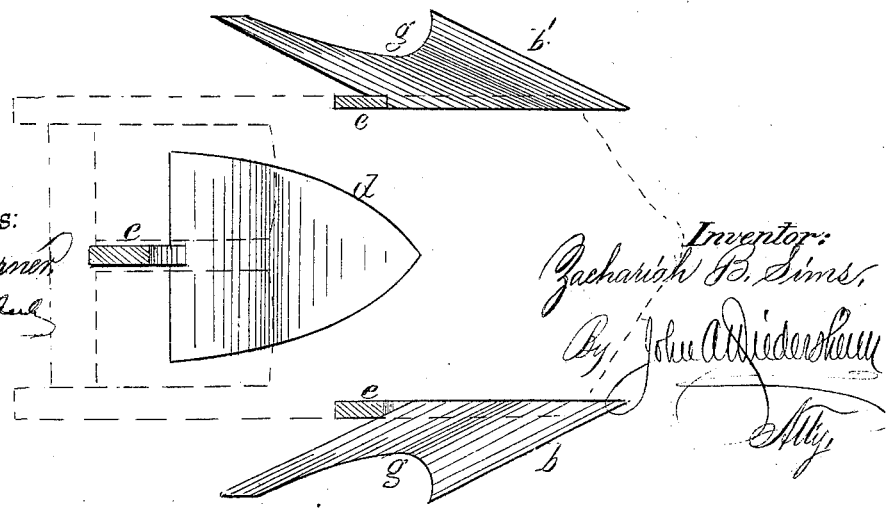
WITNESSES:
Inventor:
Zachariah B. Sims,
By John A. Wiedersheim
Atty

UNITED STATES PATENT OFFICE.

ZACHARIAH B. SIMS, OF BONHAM, TEXAS.

IMPROVEMENT IN COTTON-PLOWS.

Specification forming part of Letters Patent No. 94,351, dated August 31, 1869.

*To all whom it may concern:*

Be it known that I, ZACHARIAH B. SIMS, of Bonham, in the county of Fannin and State of Texas, have invented a new and useful Improvement in Cotton-Plows; and I do hereby declare the following to be a full, clear, and exact description of the same, sufficient to enable others skilled in the art to which my invention appertains to make and use the same, reference being had to the accompanying drawings, forming part of this specification, in which—

Figure 1 is a top view of the frame. Fig. 2 is a view of the plows when arranged for breaking up the seed-furrows, and Fig. 3 is a view of the plows when arranged for breaking up the land between the seed-furrows.

My invention relates to certain improvements in plows for breaking land for cotton or other seed, which will hereinafter be more fully set forth.

In the accompanying drawings, $a\ a$ is the frame of the machine, containing the holes $o\ o$, through which the upper ends of the shanks $e\ e$ of the plows pass for the purpose of adjustment, as fully set forth in my application (A) for cotton-plows filed May 24, 1869. $b\ b'$ are the plows, having curved pieces $g\ g$ cut out from near their rear ends, as shown in Figs. 2 and 3, to prevent the plow from clogging, while as wide and deep furrows can be made as with the ordinary plow. $c$ is a plow which is designed to run in the seed-furrow, and is placed in front of the plows $b\ b'$. In Fig. 3 the plows $b\ b'$ are reversed, the mold boards lying on the outer sides of the plow-frame, while in Fig. 2 they are situated on the inner sides of said frame. $d$, Fig. 3, is a plow situated in rear of the plows $b\ b'$. By means of the holes $o\ o$ in the frame, into which the smaller ends of the shanks $e\ e$ fit and are secured by nuts; it can readily be understood that the arrangement of the plows $b\ b'$ as seen in Fig. 2 can be changed into that shown in Fig. 3, in which the mold-boards point outwardly from the plow.

This invention is intended to be employed in breaking up the land and laying it off in seed and water furrows some weeks prior to planting the seed. The seed-furrows are first laid off, the plows being arranged as shown in Fig. 2, the plow $c$ forming the seed-furrow, while the plows $b\ b'$ form furrows in rear and at the sides of the seed-furrow, the mold-boards of the plows $b\ b'$ turning the soil over on the furrow made by plow $c$. After the seed-furrows are made by the arrangement of plows above described, and shown in Fig. 2, the plows are removed from the frame, and are reversed, so that the plow $b$ in the new arrangement occupies the place of $b'$, and the plow $b'$ that of $b$, as shown in Fig. 3. Another plow, $d$, is also placed in rear of and between the plows $b\ b'$, and this plow is larger than that used in laying off the seed-furrows.

The arrangement of plows as seen in Fig. 3 is intended to break up the land and form the water-furrows between the seed-furrows.

Having thus described my invention, what I claim as new, and desire to secure by Letters Patent, is—

The reversible plows $b\ b'$, in combination with the plows $c\ d$, for breaking up the soil and laying off seed-furrows, as and for the purpose set forth.

To the above I have signed my name this 25th day of May, 1869.

ZACHARIAH B. SIMS.

Witnesses:
    JOHN A. WIEDERSHEIM,
    PHIL. F. LARNER.